Figure 1:
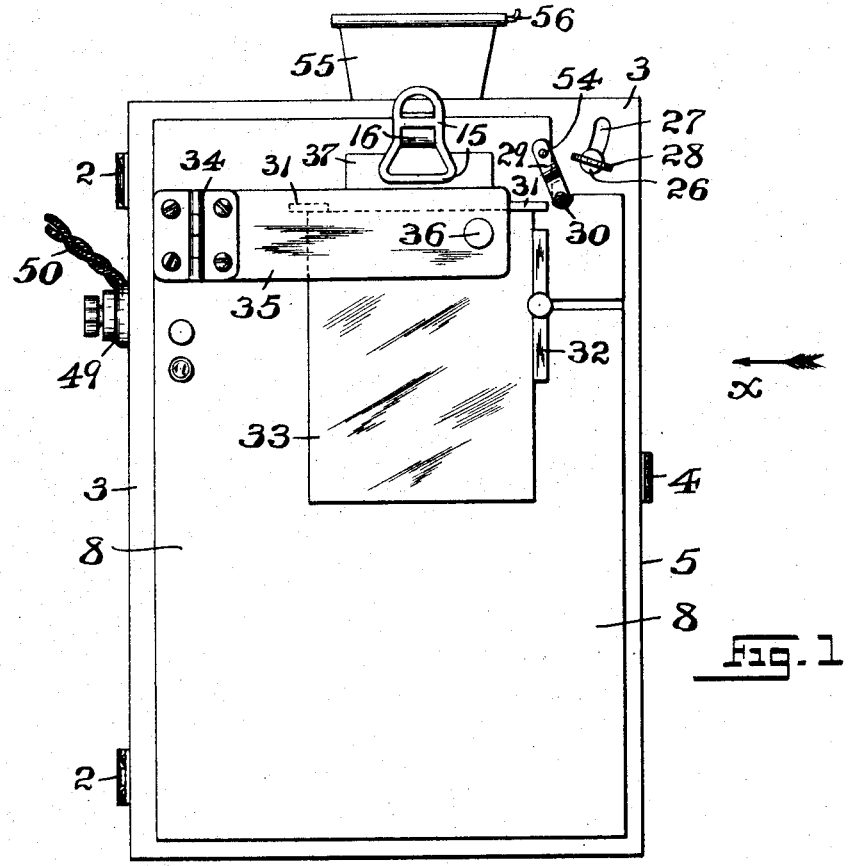

M. H. STEIN.
APPARATUS FOR PROVIDING PHOTOGRAPHIC PLATES OR FILMS WITH INDESTRUCTIBLE DESIGNATIONS.
APPLICATION FILED MAR. 17, 1915.

1,186,242.

Patented June 6, 1916.

3 SHEETS—SHEET 1.

WITNESSES:
Fredk. W. Fraentzel
Eva E. Deich.

INVENTOR:
Morris H. Stein,
BY
Fraentzel and Richards,
ATTORNEYS

M. H. STEIN.
APPARATUS FOR PROVIDING PHOTOGRAPHIC PLATES OR FILMS WITH INDESTRUCTIBLE DESIGNATIONS.
APPLICATION FILED MAR. 17, 1915.

1,186,242.

Patented June 6, 1916.
3 SHEETS—SHEET 2.

WITNESSES:

INVENTOR:
Morris H. Stein,
BY
Fraentzel and Richards,
ATTORNEYS

M. H. STEIN.
APPARATUS FOR PROVIDING PHOTOGRAPHIC PLATES OR FILMS WITH INDESTRUCTIBLE DESIGNATIONS.
APPLICATION FILED MAR. 17, 1915.

1,186,242. Patented June 6, 1916.
3 SHEETS—SHEET 3.

WITNESSES:
Fredk W. Fraentzel
Eva E. Desch

INVENTOR:
Morris H. Stein,
BY
Fraentzel and Richards
ATTORNEYS

UNITED STATES PATENT OFFICE.

MORRIS HERBERT STEIN, OF NEWARK, NEW JERSEY.

APPARATUS FOR PROVIDING PHOTOGRAPHIC PLATES OR FILMS WITH INDESTRUCTIBLE DESIGNATIONS.

1,186,242.      Specification of Letters Patent.      Patented June 6, 1916.

Application filed March 17, 1915. Serial No. 14,885.

*To all whom it may concern:*

Be it known that I, MORRIS H. STEIN, a citizen of the United States, residing at Newark, in the county of Essex and State of New Jersey, have invented certain new and useful Improvements in Apparatus for Providing Photographic Plates or Films with Indestructible Designations; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in photographic apparatus; and, the present invention has reference, more particularly, to a novel apparatus adapted for use with photographic plates or films for positively and indestructibly numerating, dating and systemizing such plates or films.

The present invention, therefore, has for its principal object to provide a novel and simply-constructed, as well as an effectively operating apparatus for the purposes above stated, and of the general character hereinafter more particularly set forth, which may be used either with day-light, gas-light, or electric light obtained from an electric battery or any other source of electrical energy, in connection with non-developed photographic plates or films for positively and indestructibly designating such plates or films with titles, names, numbers, dates, or the like, for properly systemizing such plates or films.

Other objects of this invention not at this time more particularly enumerated will be clearly understood from the following detailed description of my present invention.

With the various objects of the present invention in view, the said invention consists, primarily, in the novel plate or film-systemizing apparatus hereinafter set forth; and, the invention consists, furthermore, in the general arrangements and combinations of the various devices and parts, as well as in the details of the construction of the said parts, all of which will be more fully described in the following specification and then finally embodied in the clauses of the claims which are appended to and which form an essential part of the said specification.

The invention is clearly illustrated in the accompanying drawings, in which:—

Figure 2:
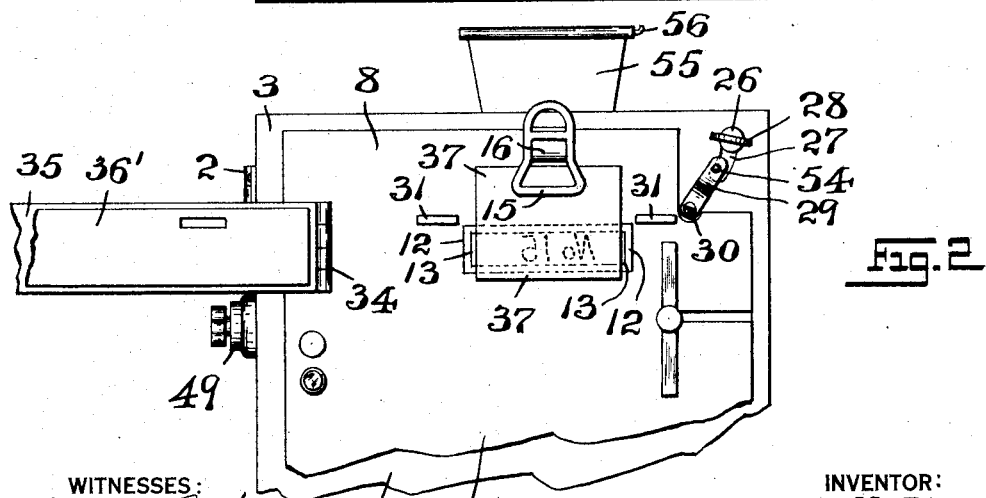
Figure 3:
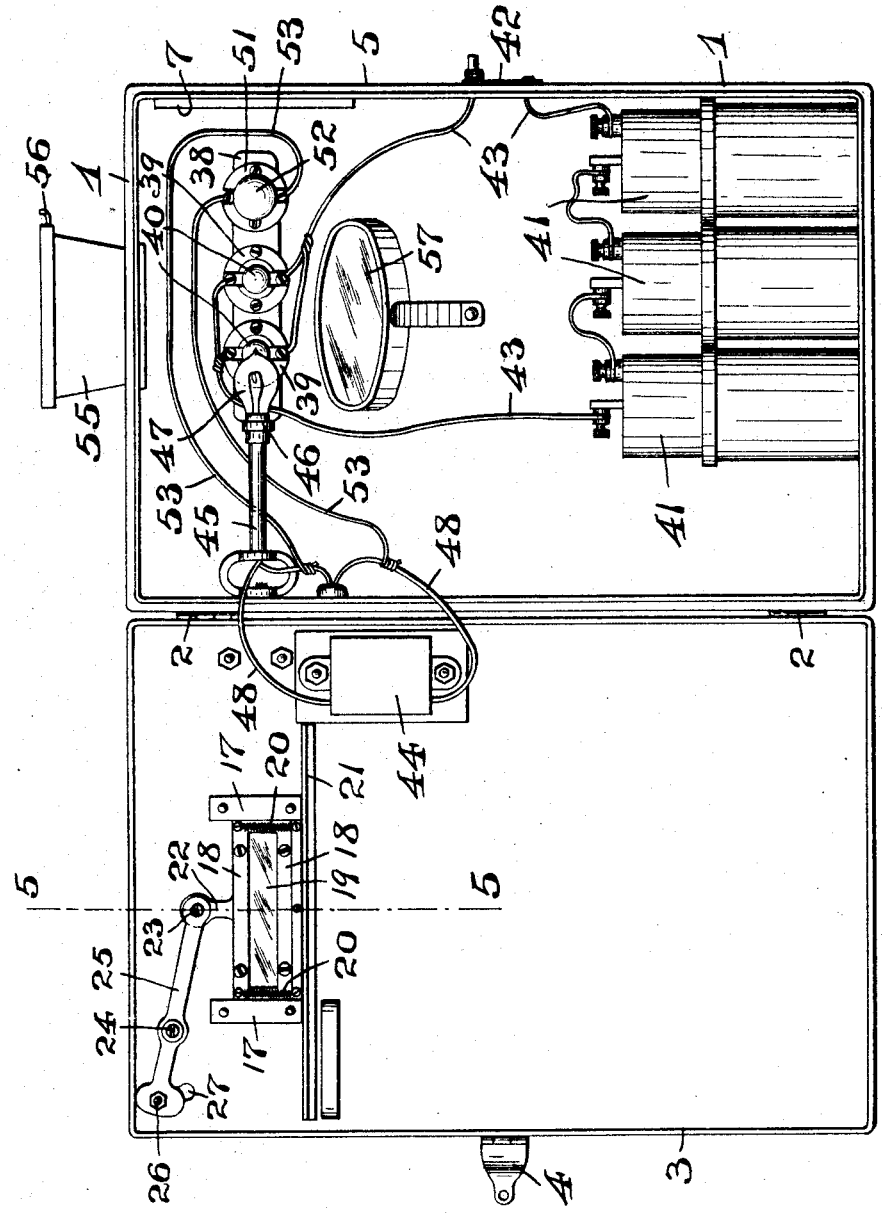
Figure 4:
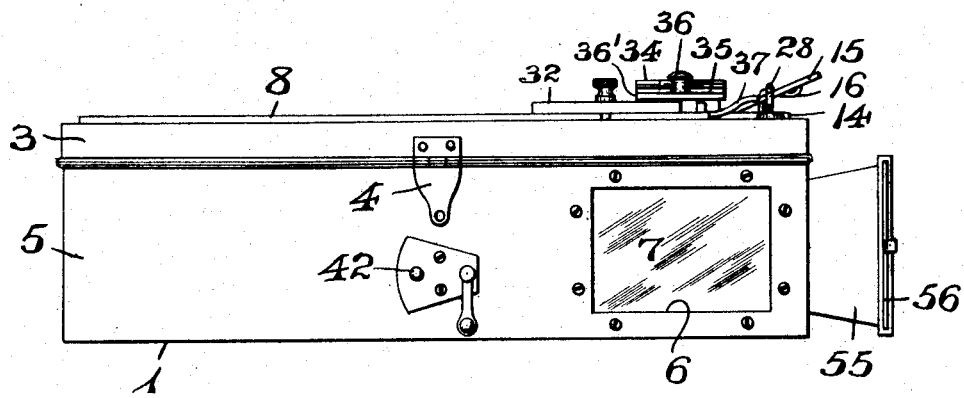
Figure 5:
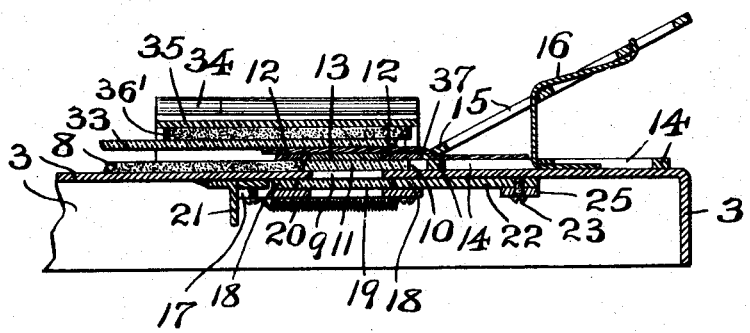
Figure 6:
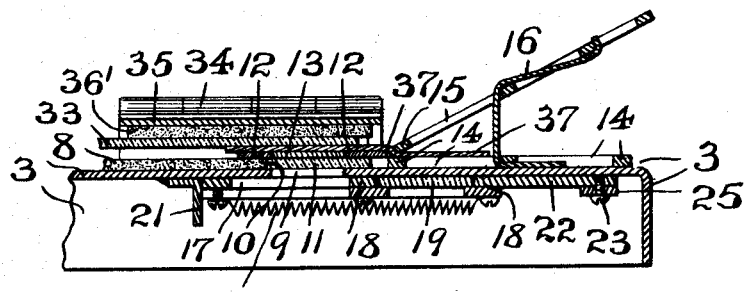

Figure 1 is a top or plan view of a photographic plate or film-systemizing apparatus, illustrating one embodiment of the principles of the present invention, showing in connection with the apparatus, the application of the negative in the form of a photographic plate, while in the act of providing the negative with a designation. Fig. 2 is a top or plan view of a fragmentary portion of the apparatus, prior to placing the negative in position. Fig. 3 is a plan view of the apparatus, comprising a main box or casing and a lid hinged thereto, the latter being represented in its opened position, and the said view illustrating generally the arrangement of the various mechanisms within said box or casing and as applied to said lid. Fig. 4 is a side elevation of the apparatus, looking in the direction of the arrow *x* in said Fig. 1. Fig. 5 is a detail vertical section of the lid, said section being taken on line 5—5 in said Fig. 3, with the parts represented in the normal positions; and Fig. 6 is a similar section, taken on the same line, but showing the parts in their operated position, while applying a designation upon the photographic plate or film.

Similar characters of reference are applied to all of the above described views, to indicate corresponding parts.

Referring now to the said figures of the drawings, the reference-character 1 indicates a suitably shaped box or receptacle which is made of metal or any other suitable material, and to one edge of which is hinged, as at 2, or at any other suitable portion of the box or receptacle 1, a correspondingly shaped lid or cover, as 3. The said lid or cover 3 and the box or receptacle 1 may be brought into their locked relation by means of a suitably-constructed lock-catch, as 4, or other suitably formed locking means, which is suitably secured to and connected with the proper portions of the lid or cover and the box or receptacle, as will be clearly evident. In one of its sides, as 5, the said box or receptacle 1 may be provided with an opening, as 6, which is closed by means of a piece of ruby or red glass 7, or other similarly colored transparent material. The said lid or cover 3 is suitably provided upon its upper and outer surface with a cushion 8 made of a soft material, such as felt or the like. At a suitable point, near one of the marginal edges of the cover or lid 3, the said lid or cover has an opening, as 9, see Figs. 5 and 6 of the drawings, the felt at this point being also suitably cut away, to form an opening 10, in which is arranged and suitably secured a piece of ground glass, as 11. Suitably mounted above this glass 11 is a suitably-formed frame 12 and a piece of paper 13, or similar material which will permit of the transmission of light therethrough. Directly back of this window thus provided is a suitably constructed clamping device, comprising a main body, as 14, mounted in a fixed position upon the said lid or cover 3, and a movable clamping jaw-member 15, suitably supported and controlled by a spring-member 16. Any other suitably-constructed clamping device, however, may be employed as will be clearly understood. Upon the inner surface or back of the said lid or cover 3, contiguous to the said opening 9 are a pair of guides 17 between which is slidably arranged a frame 18 provided with a ruby or red glass 19, said frame 18 and glass 19 providing a suitable shutter over the back of said opening 9, as will be evident. The normal position of this shutter is to close the opening 9, this closing relation being maintained by a pair of coiled springs 20, attached at one of their ends to the said frame 18 and at their other ends to a reinforcing rib-like element, as 21, extending laterally across the back of the said lid or cover 3, substantially as shown in Figs. 3, 5 and 6 of the drawings. In order to move said shutter from its normally closed relation with the opening 9, shown in said Figs. 3 and 5, into its opened relation with said opening, as represented in said Fig. 6, the frame 18 is provided with a projection, as 22, which is provided with a pivot-post or stud 23. Pivotally mounted upon a post or stud 24, projecting from the back of said lid or cover 3, is a lever or arm 25 which is pivotally connected at its one end-portion with the pivot-post or stud 23. Upon its other end-portion, the said lever or arm 25 is provided with a post 26, said post 26 extending in an upward direction into and through a slot 27 in the said lid or cover 3, and in which slot the said post 26 is adapted to move. Upon its outer end, the said post 26 has a suitably formed fingerpiece, as 28, for moving said post 26 back and forth, to thereby by means of the lever or arm 25 operate the said shutter, the movements of the parts being limited by the movement of the post 26 in said slot 27, as will be clearly evident. A stop-arm or finger 29, pivotally mounted upon a pin or post 30, may be employed for retaining the post 26, and the parts just described in their immovable relation, if desired, when the stop-arm or finger 29 is in the position indicated in Fig. 2 of the drawings.

Plate-guiding bars or elements 31, and a movable guide-bar or element 32 may be employed for locating a photographic film or plate 33 in its proper position over the window and shutter in the manner shown in Figs. 2, 5 and 6 of the drawings, and for the purposes hereinafter more fully described.

Suitably located, at any desired place, upon the cushioned upper surface of the lid or cover 3, is a hinge, as 34, with which is pivotally connected, in any suitable manner, a retaining or holding-down element 35, in the form of a plate, which may be provided with a knob 36 or any other suitable means, for bringing said element or plate 35 in its raised relation to the lid or cover 3, and to the said window and shutter of said lid or cover. Upon its under surface, the said element or plate 35 may also be faced with a soft cushion 36, of felt or any other suitable or similar material.

The means for providing the photographic film or plate 33 with any desired designation, such as a name, number, date, and the like, may be merely a suitable piece of paper, as 37, upon which the designation or designations are written or printed, and which is of such consistency to permit the passage of light-rays therethrough. By means of the previously-mentioned clamping device, this designation-bearing element or piece of paper 37 is secured in its clamped relation directly over the window and its shutter in the manner shown in Fig. 2 of the drawings, bringing the designation directly over the window. The photographic plate or film is then placed over said element or paper 37, with its respective edges against plate-guiding bars or gages 31 and 32, and the retaining or holding-down element 35 brought down over the edge-portion of the photographic plate or film, in the manner illustrated in Fig. 1 of the drawings, to hold the said photographic film or plate in its fixed position above the window and shutter in said cover or lid 3, as will be clearly evident.

Referring now to Fig. 3 of the drawings, it will be seen, that within the box or receptacle 1 of the apparatus, and in alinement with the window or shutter in the lid or cover 3, when the latter is closed upon said box or receptacle 1, is a plate, as 38, upon which are mounted electric-light sockets 39 into which are screwed electric light bulbs 40, said bulbs being in circuit with electric batteries 41, and a suitable electric switch 42 by means of the usual circuit-wires 43. The electric switch 42 is suitably secured upon the outer surface of one of the sides of the box or receptacle 1, but it may be located upon any other suitable part of the apparatus; and, it will also be evident, that the said electric batteries 41, while being shown located within the said box or receptacle 1, may be located at any other suitable place outside of the said box or receptacle 1.

In lieu of the electric batteries, any other source of electrical energy may be employed. In the latter case, the lid or cover 3, or other suitable part of the apparatus is provided with a push-switch 44 of any usual construction, and within the box or receptacle 1 is arranged a suitably formed holder or bracket, as 45, carrying a lamp-socket 46 and an electric light bulb 47 which is connected with the switch 44 by means of the circuit-wires 48. In the circuit-wires 48, at the proper point is located the usual main switch, as 49, for cutting in and out of the main circuit-wires 50 leading from the main source of electrical energy. The previously-mentioned plate 38 may also be provided with another electric light socket, as 51, into which is screwed an electric light 52, the bulb of which is of ruby or red glass, so as to provide a ruby or red light, the said electric light 52 being placed in circuit by means of the auxiliary circuit-wires 53 with the circuit-wires 48, substantially in the manner represented in said Fig. 3 of the drawings.

From the foregoing it will be seen that illumination of the back of the window in the lid or cover 3 may be provided from either set of electric lights, the apparatus being used in the usual dark room.

The designation-bearing element or paper 37 and the photographic film or plate 33, with its emulsion side down, having been placed in position in the manner hereinabove described, either set of electric lamps are lighted. The normally closed shutter upon the back of the window in the lid or cover 3 is now manipulated in the manner previously stated, thus causing the written or printed designation to be permanently photographed along any one of the desired edge-portions of the film or plate, which is thereupon fully brought to view when the entire plate or film is being developed in the usual manner.

After the proper exposure, the springs connected with the shutter are allowed to again return the manipulated shutter to its normal initial position to again close the said window in the lid or cover 3.

It will be evident, that the designation with which the film or plate is to be provided may be produced either before or after exposure of the main portion of the film or plate, as may be desired.

When exposure is to be made by means of the electric lighting system, in connection with the previously-mentioned ruby or red light, the shutter back of the window in the lid or cover 3 may be left in its open position, as will be evident. This may be accomplished by any suitable means, one means being by providing the pivoted stop-arm or finger 29 with a projection, as 54, which can be moved back of the fingerpiece 28 of the post 26 when the latter is in the position indicated in Fig. 1 of the drawings, so as to retain the said post 26 in the said position shown in said Fig. 1, the exposure being made by turning on the normally interrupted electric light 47, as will be clearly understood.

In order to employ the apparatus with day-light or gas light the main box or receptacle 1 may be provided in the proper place in one of its sides with a suitable opening over which is placed a suitably constructed cone, as 55, in which may be placed a suitable slide or gate, as 56, for opening and closing said cone, the main body of the apparatus being located in the usual dark chamber and the cone 55 extending through a suitable opening formed in the wall or partition of the dark chamber. In that case, the several electric bulbs may be removed and the light allowed to pass into the cone upon an angularly arranged mirror or reflector, as 57, placed in suitable position within the box or receptacle, which will reflect the light directly upon the back of the shutter, which is to be manipulated for exposure in the same manner previously described in the foregoing specification.

In using gas light, the lighted gas-jet is placed directly in front of the opened cone 55, the light being thrown upon the mirror or reflector 57, and thence reflected as above stated to the shutter.

From the foregoing description it will be clearly seen that I have provided a simply constructed and effectively operating apparatus by means of which, through exposure, designations such as names, titles, dates, numbers and other designations for systemizing photographic plates or films are permanently produced at any one or more of the marginal edge-portions of the plates or films, which designations can not be accidentally effaced or destroyed.

I am fully aware that changes may be made in the general arrangements and combinations of the various devices and parts, as well as in the details of the construction of the said parts, without departing from the scope of the present invention as set forth in the foregoing specification, and as defined in the clauses of the claims which are appended to the said specification. Hence, I do not limit my present invention to the exact arrangements and combinations of the various devices and parts as described in the said specification, nor do I confine myself to the exact details of the construction of the said parts as illustrated in the accompanying drawings.

I claim:—

1. An apparatus of the character specified for providing photographic plates or films with indestructible designations comprising a plate or film-supporting element, an exposing window in said element, a shutter movable with relation to said window, and means for arranging a designation-bearing element over said window, combined with a plate or film-retaining means for retaining a photographic plate or film over said designation-bearing element.

2. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a finger-piece connected with said lever, and means for arranging a designation-bearing element over said window.

3. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a finger-piece connected with said lever, and means for arranging a designation-bearing element over said window, combined with a plate or film-retaining means for retaining a photographic plate or film over said designation-bearing element.

4. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a fingerpiece connected with said lever, means for holding said shutter in its opened relation to said window consisting of a pivoted arm provided with a stud adapted to be brought into holding engagement with the finger-piece of said lever, and means for arranging a designation-bearing element over said window.

5. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a finger-piece connected with said lever, means for holding said shutter in its opened relation to said window consisting of a pivoted arm provided with a stud adapted to be brought into holding engagement with the finger-piece of said lever, and means for arranging a designation-bearing element over said window, combined with a plate or film-retaining means for retaining a photographic plate or film over said designation-bearing element.

6. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a finger-piece connected with said lever, and means for arranging a designation-bearing element over said window, combined with a plate or film-retaining means for retaining a photographic plate or film over said designation-bearing element, consisting of a bar-like member, means for hinging said member upon said plate or film-supporting element, and a cushion upon the plate or film-engaging portion of said bar-like member.

7. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a finger-piece connected with said lever, means for holding said shutter in its opened relation to said window consisting of a pivoted arm provided with a stud adapted to be brought into holding engagement with the finger-piece of said lever, and means for arranging a designation-bearing element over said window, combined with a plate or film-retaining means for retaining a photographic plate or film over said designation-bearing element, consisting of a bar-like member, means for hinging said member upon said plate or film-supporting element, and a cushion upon the plate or film-engaging portion of said bar-like member.

8. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a fingerpiece connected with said lever, and a clamp adjacent to said window for arranging a designation-bearing element for exposure over said window.

9. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a fingerpiece connected with said lever, and a clamp adjacent to said window for arranging a designation-bearing element for exposure over said window, combined with a plate or film-retaining means for retaining a photographic plate or film over said designation-bearing element.

10. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a finger-piece connected with said lever, means for holding said shutter in its opened relation to said window consisting of a pivoted arm provided with a stud adapted to be brought into holding engagement with the finger-piece of said lever, and a clamp adjacent to said window for arranging a designation-bearing element for exposure over said window.

11. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a fingerpiece connected with said lever, means for holding said shutter in its opened relation to said window consisting of a pivoted arm provided with a stud adapted to be brought into holding engagement with the finger-piece of said lever, and a clamp adjacent to said window for arranging a designation-bearing element for exposure over said window, combined with a plate or film-retaining means for retaining a photographic plate or film over said designation-bearing element.

12. An apparatus of the character specified for providing photographic plates or films with indestructible designations comprising a plate or film-supporting element, an exposing window in said element, and a clamp adjacent to said window for arranging a designation-bearing element for exposure over said window, combined with a plate or film-retaining means for retaining a photographic plate or film over said designation-bearing element, consisting of a bar-like member, means for hinging said member upon said plate or film-supporting element, and a cushion upon the plate or film-engaging portion of said bar-like member.

13. An apparatus of the character specified for providing photographic plates or films with indestructible designations comprising a plate or film-supporting element, an exposing window in said element, a shutter movable with relation to said window, and a clamp adjacent to said window for arranging a designation-bearing element for exposure over said window, combined with a plate or film-retaining means for retaining a photographic plate or film over said designation-bearing element, consisting of a bar-like member, means for hinging said member upon said plate or film-supporting element, and a cushion upon the plate or film-engaging portion of said bar-like member.

14. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a fingerpiece connected with said lever, and a clamp adjacent to said window for arranging a designation-bearing element for exposure over said window, combined with a plate or film-retaining means for retaining a photographic plate or film over said designation-bearing element, consisting of a bar-like member, means for hinging said member upon said plate or film-supporting element, and a cushion upon the plate or film-engaging portion of said bar-like member.

15. An apparatus of the character specified for providing photographic plates or films with indestructible designations comprising a plate or film-supporting element, an exposing window in said element, guides located near said window, a spring-controlled shutter movably disposed between said guides, means for operating said shutter consisting of a fulcrumed lever pivotally connected with said shutter, a fingerpiece connected with said lever, means for holding said shutter in its opened relation to said window consisting of a pivoted arm provided with a stud adapted to be brought into holding engagement with the fingerpiece of said lever, and a clamp adjacent to said window for arranging a designation-bearing element for exposure over said window, combined with a plate or film-retaining means for retaining a photographic plate or film over said designation-bearing element, consisting of a bar-like member, means for bringing said member upon said plate or film-supporting element, and a cushion upon the plate or film-engaging portion of said bar-like member.

16. An apparatus of the character specified for providing photographic plates or films with indestructible designations comprising a box-shaped main body, a plate or film-supporting lid connected with said body, an exposing window in said lid, guides located near said window, a spring-controlled shutter movably disposed between said guides, means for operating said shutter consisting of a fulcrumed lever pivotally connected with said shutter, a fingerpiece connected with said lever, means connected with said box-like body for producing and conveying light back of said shutter and window, and means for arranging a designation-bearing element for exposure over said window.

17. An apparatus of the character specified for providing photographic plates or films with indestructible designations comprising a box-shaped main body, a plate or film-supporting lid connected with said body, an exposing window in said lid, guides located near said window, a spring-controlled shutter movably disposed between said guides, means for operating said shutter consisting of a fulcrumed lever pivotally connected with said shutter, a fingerpiece connected with said lever, means connected with said box-like body for producing and conveying light back of said shutter and window, and means for arranging a designation-bearing element for exposure over said window, combined with a plate or film-retaining means for retaining a photographic plate or film over said designation-bearing element.

18. An apparatus of the character specified for providing photographic plates or films with indestructible designations comprising a box-shaped main body, a plate or film-supporting lid connected with said body, an exposing window in said lid, guides located near said window, a spring-controlled shutter movably disposed between said guides, means for operating said shutter consisting of a fulcrumed lever pivotally connected with said shutter, a fingerpiece connected with said lever, means connected with said box-like body for producing and conveying light back of said shutter and window, and means for arranging a designation-bearing element for exposure over said window, combined with a plate or film-retaining means for retaining a photographic plate or film over said designation-bearing element, consisting of a bar-like member, means for hinging said member upon said plate or film-supporting element, and a cushion upon the plate or film-engaging portion of said bar-like member.

19. An apparatus of the character specified for providing photographic plates or films with indestructible designations comprising a box-shaped main body, a plate or film-supporting lid connected with said body, an exposing window in said lid, guides located near said window, a spring-controlled shutter movably disposed between said guides, means for operating said shutter consisting of a fulcrumed lever pivotally connected with said shutter, a fingerpiece connected with said lever, means for holding said shutter in its opened relation to said window consisting of a pivoted arm provided with a stud adapted to be brought into holding engagement with the fingerpiece of said lever, means connected with said box-like body for producing and conveying light back of said window, and means for arranging a designation-bearing element for exposure over said window.

20. An apparatus of the character specified for providing photographic plates or films with indestructible designations comprising a box-shaped main body, a plate or film-supporting lid connected with said body, an exposing window in said lid, guides located near said window, a spring-controlled shutter movably disposed between said guides, means for operating said shutter consisting of a fulcrumed lever pivotally connected with said shutter, a fingerpiece connected with said lever, means for holding said shutter in its opened relation to said window consisting of a pivoted arm provided with a stud adapted to be brought into holding engagement with the fingerpiece of said lever, means connected with said box-like body for producing and conveying light back of said window, and means for arranging a designation-bearing element for exposure over said window, combined with a plate or film-retaining means for retaining a photographic plate or film over said designation-bearing element.

21. An apparatus of the character specified for providing photographic plates or films with indestructible designations comprising a box-shaped main body, a plate or film-supporting lid connected with said body, an exposing window in said lid, guides located near said window, a spring-controlled shutter movably disposed between said guides, means for operating said shutter consisting of a fulcrumed lever pivotally connected with said shutter, a fingerpiece connected with said lever, means for holding said shutter in its opened relation to said window consisting of a pivoted arm provided with a stud adapted to be brought into holding engagement with the fingerpiece of said lever, means connected with said box-like body for producing and conveying light back of said window, and means for arranging a designation-bearing element for exposure over said window, combined with a plate or film-retaining means for retaining a photographic plate or film over said designation-bearing element, consisting of a bar-like member, means for bringing said member upon said plate or film-supporting element, and a cushion upon the plate or film-engaging portion of said bar-like member.

22. An apparatus of the character specified for providing photographic plates or films with indestructible designations comprising a box-shaped main body, said body having its entire top open, a plate or film-supporting lid hinged at one edge of said open top and adapted to close the same, an exposing window in said lid, a clamp adjacent to said window for arranging a designation-bearing element for exposure over said window and means connected with said box-like body for producing and conveying light back of said window.

23. An apparatus of the character specified for providing photographic plates or films with indestructible designations comprising a box-shaped main body, said body having its entire top open, a plate or film-supporting lid hinged at one edge of said open top and adapted to close the same, an exposing window in said lid, a clamp adjacent to said window for arranging a designation-bearing element for exposure over said window, and means connected with said box-like body for producing and conveying light back of said window, combined with a plate or film-retaining means for retaining a photographic plate or film over said designation-bearing element.

24. An apparatus of the character specified for providing photographic plates or films with indestructible designations comprising a box-shaped main body, said body having its entire top open, a plate or film-supporting lid hinged at one edge of said open top and adapted to close the same, an exposing window in said lid, a clamp adjacent to said window for arranging a designation-bearing element for exposure over said window, and means connected with said box-like body for producing and conveying light back of said window, combined with a plate or film-retaining means for retaining a photographic plate or film over said designation-bearing element, consisting of a bar-like member, means for hinging said member upon said plate or film-supporting element, and a cushion upon the plate or film engaging portion of said bar-like member.

25. An apparatus of the character specified for providing photographic plates or films with indestructible designations comprising a box-shaped main body, a plate or film-supporting lid connected with said body, an exposing window in said lid, guides located near said window, a spring-controlled shutter movably disposed between said guides, means for operating said shutter consisting of a fulcrumed lever pivotally connected with said shutter, a fingerpiece connected with said lever, a clamp adjacent to said window for arranging a designation-bearing element for exposure over said window, and means connected with said box-like body for producing and conveying light back of said shutter and said window, combined with a plate or film-retaining means for retaining a photographic plate or film over said designation-bearing element.

26. An apparatus of the character specified for providing photographic plates or films with indestructible designations comprising a box-shaped main body, a plate or film-supporting lid connected with said body, an exposing window in said lid, guides located near said window, a spring-controlled shutter movably disposed between said guides, means for operating said shutter consisting of a fulcrumed lever pivotally connected with said shutter, a fingerpiece connected with said lever, a clamp adjacent to said window for arranging a designation-bearing element for exposure over said window, and means connected with said box-like body for producing and conveying light back of said shutter and said window, combined with a plate or film-retaining means for retaining a photographic plate or film over said designation-bearing element, consisting of a bar-like member, means for hinging said member upon said plate or film-supporting element, and a cushion upon the plate or film-engaging portion of said bar-like member.

27. An apparatus of the character specified for providing photographic plates or films with indestructible designations comprising a box-shaped main body, a plate or film-supporting lid connected with said body, an exposing window in said lid, guides located near said window, a spring-controlled shutter movably disposed between said guides, means for operating said shutter consisting of a fulcrumed lever pivotally connected with said shutter, a fingerpiece connected with said lever, means for holding said shutter in its opened relation to said window consisting of a pivoted arm provided with a stud adapted to be brought into holding engagement with the fingerpiece of said lever, and means connected with said box-like body for producing and conveying light back of said window.

28. An apparatus of the character specified for providing photographic plates or films with indestructible designations comprising a box-shaped main body, a plate or film-supporting lid connected with said body, an exposing window in said lid, guides located near said window, a spring-controlled shutter movably disposed between said guides, means for operating said shutter consisting of a fulcrumed lever pivotally connected with said shutter, a fingerpiece connected with said lever, means for holding said shutter in its opened relation to said window consisting of a pivoted arm provided with a stud adapted to be brought into holding engagement with the fingerpiece of said lever, and means connected with said box-like body for producing and conveying light back of said window, combined with a plate or film-retaining means for retaining a photographic plate or film over said designation-bearing element.

29. An apparatus of the character specified for providing photographic plates or films with indestructible designations comprising a box-shaped main body, a plate or film-supporting lid connected with said body, an exposing window in said lid, guides located near said window, a spring-controlled shutter movably disposed between said guides, means for operating said shutter consisting of a fulcrumed lever pivotally connected with said shutter, a fingerpiece connected with said lever, means for holding said shutter in its opened relation to said window consisting of a pivoted arm provided with a stud adapted to be brought into holding engagement with the fingerpiece of said lever, and means connected with said box-like body for producing and conveying light back of said window, combined with a plate or film-retaining means for retaining a photographic plate or film over said designation-bearing element, consisting of a bar-like member, means for hinging said member upon said plate or film-supporting element, and a cushion upon the plate or film-engaging portion of said bar-like member.

In testimony, that I claim the invention set forth above I have hereunto set my hand this 15th day of March, 1915.

MORRIS HERBERT STEIN.

Witnesses:
  FREDK. C. FRAENTZEL,
  FREDK. M. W. FRAENTZEL.

Copies of this patent may be obtained for five cents each, by addressing the "Commissioner of Patents, Washington, D. C."